United States Patent [19]

Marshall

[11] Patent Number: 5,224,752
[45] Date of Patent: Jul. 6, 1993

[54] VEHICLE BODIES
[75] Inventor: Howard A. Marshall, Leek Wootton, United Kingdom
[73] Assignee: Jaguar Cars Limited, England
[21] Appl. No.: 738,333
[22] Filed: Jul. 31, 1991
[30] Foreign Application Priority Data
Aug. 21, 1990 [GB] United Kingdom ............... 9018350
[51] Int. Cl.⁵ .................... B60P 5/04; B60R 21/02
[52] U.S. Cl. .................... 296/146 C; 296/188; 296/202; 292/144; 292/DIG. 17; 49/503
[58] Field of Search ............... 296/146 C, 146 R, 188, 296/189, 202; 292/144, DIG. 17, DIG. 65; 49/502, 503

[56] References Cited

U.S. PATENT DOCUMENTS 3,718,364 2/1973 Fischer et al. ................. 296/189
4,940,282 7/1990 Townsend ..................... 296/204

FOREIGN PATENT DOCUMENTS

| 0260767 | 3/1988 | European Pat. Off. |
| 2006498 | 9/1971 | Fed. Rep. of Germany ...... 296/188 |
| 2045875 | 3/1972 | Fed. Rep. of Germany . |
| 2254840 | 6/1973 | Fed. Rep. of Germany . |
| 3512414 | 10/1986 | Fed. Rep. of Germany ...... 292/144 |
| 1260976 | 4/1961 | France ..................... 292/D65 |
| 2207039 | 6/1974 | France . |
| 1292011 | 10/1972 | United Kingdom . |
| 1340833 | 12/1973 | United Kingdom . |
| 1353738 | 5/1974 | United Kingdom . |
| 1365821 | 9/1974 | United Kingdom . |
| 2028730 | 3/1980 | United Kingdom ............ 296/188 |
| 2045331 | 10/1980 | United Kingdom ............ 292/D17 |
| 2101535 | 1/1983 | United Kingdom ............ 296/202 |

Primary Examiner—Dennis H. Pedder
Attorney, Agent, or Firm—Davis, Bujold & Streck

[57] ABSTRACT

A vehicle body has a door aperture the door aperture being bounded along its lower edge by a sill section and by forward and rearward upstanding post sections, a door being located in the door aperture, the door being hinged to one post section and releasably engaging a catch on the other post section, a tie bar is provided adjacent the edge of the door remote from the sill section, clamping elements being provided for releasably clamping the tie bar with respect to both the forward and rearward post sections when the door is closed, the tie bar being capable when clamped of transmitting tensile, compressive and torsional loads from one post section to the other post section.

10 Claims, 4 Drawing Sheets

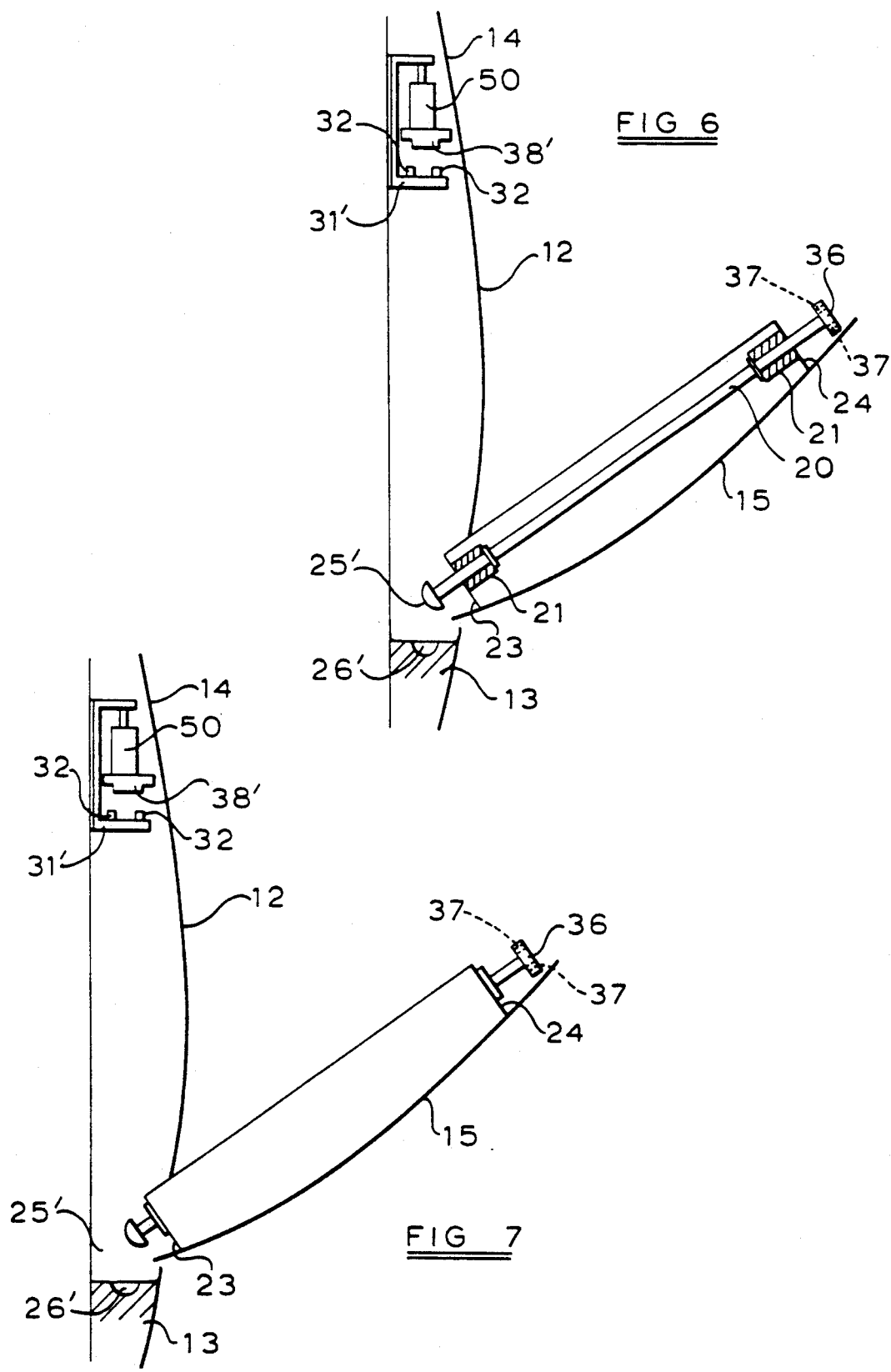

VEHICLE BODIES

BACKGROUND TO THE INVENTION

The present invention relates to vehicle bodies and in particular although not exclusively to the bodies of convertible vehicles.

The stability and refinement of a vehicle is very much dependent upon the rigidity of the vehicle body which serves to locate the suspension and wheels of the vehicle. The torsional and bending stiffness of the vehicle body are adversely affected by the door openings necessary to permit access to the vehicle. In vehicles with saloon bodies, the roof of the vehicle contributes greatly to the torsional and bending stiffness of the vehicle. However, with convertible vehicles, the torsional and bending stiffness is provided mainly by the sill section. As the sill sections are located very close to the neutral axis of the vehicle, they must be of substantial nature to provide adequate stiffening of the body. Hitherto, it has been found necessary to reinforce the sill sections by adding substantial subframes beneath the floor of the passenger compartment of the vehicle.

SUMMARY OF THE INVENTION

According to one aspect of the present invention a vehicle body has; a door aperture, the door aperture being bounded along its lower edge by a sill section and by forward and rearward upstanding post sections; and a door located in the door aperture, the door being hinged to one post section and releasably engaging a catch on the other post section; means being provided adjacent the edge of the door remote from the sill section for releasably clamping the door with respect to both the forward and rearward post sections when the door is closed, said means being capable of transmitting tensile, compressive and torsional loads.

In accordance with the present invention when the doors are closed and clamping means engaged, the doors will resist compressive, tensile and torsional stresses and will add significantly to the torsional and bending stiffness of the vehicle body. According to a preferred embodiment tie bars are located across the doors adjacent the upper edge thereof, in order to tie the clamping means together so that compressive, tensile and torsional loads will be transmitted through the tie bars. The tie bars should be located as far as possible away from the neutral axis of the body so that tie bars of low sectional modulus may be used.

BRIEF DESCRIPTION OF THE DRAWINGS

The invention is now described, by way of example only, with reference to the accompanying drawings, in which:-

FIG. 6 shows diagrammatically, in a similar view to FIG. 2, a further embodiment of the invention; and FIG. 7 shows diagrammatically the pair of tie bar ends being secured to the front and rear edges of the door for transmitting load.

DESCRIPTION OF A PREFERRED EMBODIMENT

Figure 1:
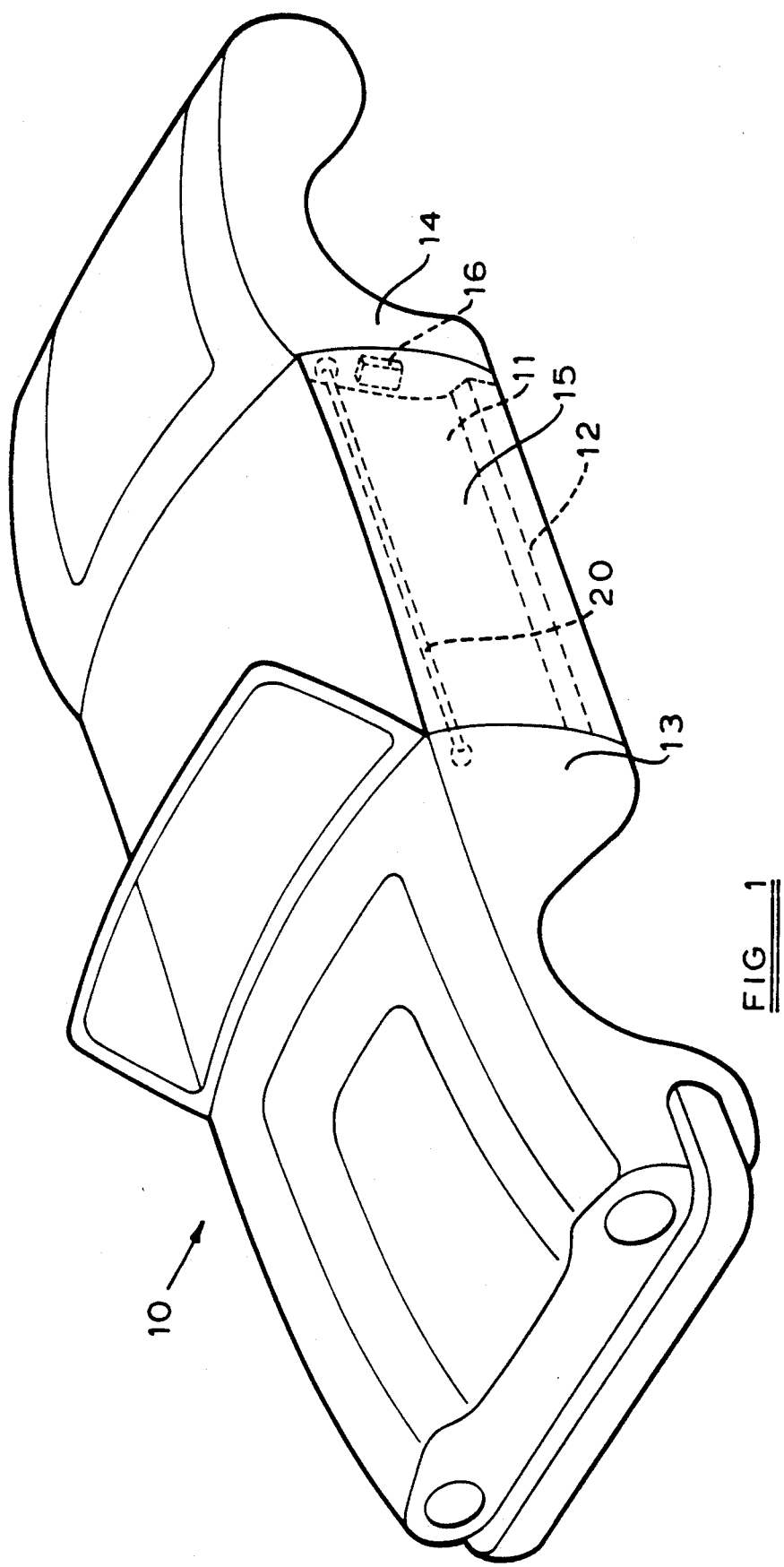
FIG. 1 illustrates in perspective view, a vehicle body in accordance with the present invention.
Figure 2:
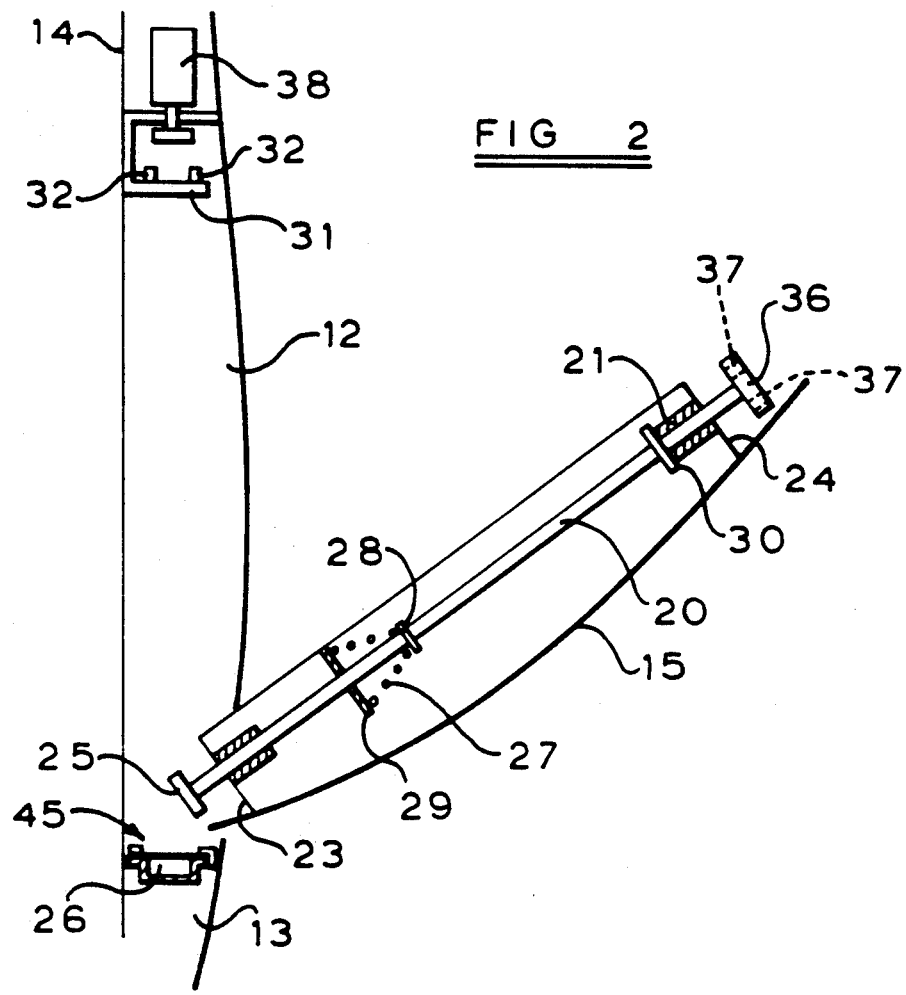
FIG. 2 shows a diagramatic plan section through part of the vehicle body illustrated in FIG. 1, with the door open.

As illustrated in FIG. 1, a convertible vehicle body 10 has door aperture 11 at either side, each door aperture 11 being bounded along the bottom by a sill section 12 and forwardly and rearwardly by post sections 13 and 14. Doors 15 are hinged to the post section 13 and, when closed, a conventional lock 16 on each door releasably engages catch means on the post section 14.

A tie bar 20 is located in each of the doors 15, the tie bar 20 extending longitudinally of the vehicle and being mounted adjacent the upper edge of the door 15, through bush bearings 21 secured to the door 15. The tie bar 20 extends beyond the side edges 23 and 24 of the door 15. A spring 27 acts between a circlip 28 secured to the tie bar 20 and a bracket 29 attached to the door 15 to urge the tie bar 20 axially away from post section 13. A stop 30 is provided on the tie bar 20 and engages the bush bearing 21 adjacent edge 24 of door 15, to limit rearward movement of the tie bar 20.

The end of the tie bar 20 remote from post section 13 has a head formation 36. The head formation 36 has a pair of diametrically opposed holes 37 formed therein, the axes of the holes 37 being parallel to the axis of the tie bar 20. A T-bar 25 of rectangular section is secured to the end of tie bar 20 adjacent post section 13.

A bifurcated keeper plate 31 is provided on the post section 14, so that when the door is closed, the head formation 36 of the tie bar 20 will be located rearwardly of the keeper plate 31, the tie rod 20 passing between the bifurcated portions of the keeper plate 31. A pair of torsion pins 32 extend rearwardly from the keeper plate 31 in corresponding relationship to the holes 37 in the head formation 36. A solenoid controlled clamping plunger 38 is mounted rearwardly of the keeper plate 31 so that it is coaxial with the tie rod 20 when the door 15 is closed. The clamping plunger 28 is movable between a retracted position in which it is spaced rearwardly of the keeper plate 31 and an engaged position in which it is displaced towards the keeper plate 31.

Figure 4:
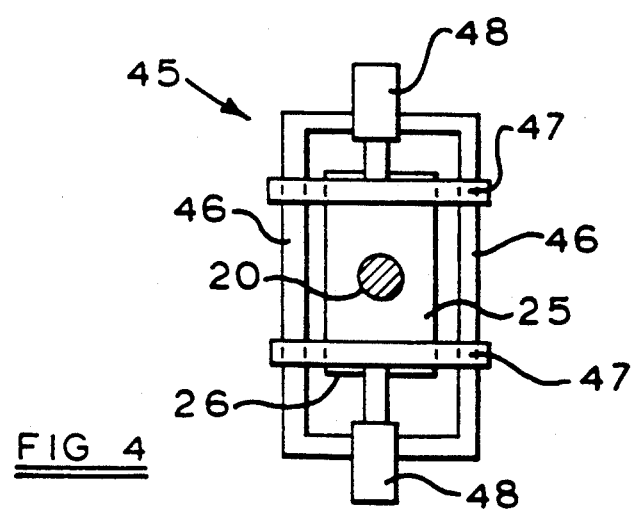
FIG. 4 shows in detail a clamping mechanism used in the embodiment illustrated in FIG. 2.

A rectangular recess 26 corresponding to the T-bar 25 is provided in post section 13 and clamping means 45 as illustrated in detail in FIG. 4 is provided to clamp the T-bar 25 in recess 26, when the door is closed. The clamping means 45 comprises a guide frame having a pair of vertically extending linear bearings 46 upon which are slidingly mounted a pair of clamping bars 47. Solenoid actuators 48 are provided for moving the clamping bars 47 between a retracted position in which they are clear of the recess 26 and a clamped position in which they overlay recess 26 and the T-bar 25 located therein.

When stop 30 engages the bush bearing 21 adjacent edge 24 of door 15, the tie bar 20 with head formation 36 and T-bar 25 are dimensioned such that when the door 15 is closed, the head formation 36 will locate between the keeper plate 31 and clamping plunger 38 clear of the torsion pins 32, the T-bar 25 being located in alignment with recess 26 but axially clear thereof. The clamping plunger 38 may then be energised to move it towards keeper plate 31 so that it engages the head formation 36 and moves the tie bar 20 axially forwards, so that torsion pins 32 engage in holes 37 and the T-bar 25 engages in the recess 26. The solenoid actuators 48 will then move clamping bars 47 so that they overlay the T-bar 25 and clamp it in the recess 26. In order to facilitate clamping and accommodate wear, the T-bar 25 may be tapered on its rearward face, so that the thickness thereof decreases away from the tie bar 20.

In the manner described above, when the clamping solenoid 38 is energised, the head formation 36 will be clamped between the plunger 38 and keeper plate 31 to transmit compressive and tensile loads therebetween while the torsion pins 32 engaging in holes 37 will transmit torsional load. At the forward end of the tie bar 20, engagement of the T-bar 25 in recess 26 will transmit torsional loads while the clamping bars 29 will clamp the T-bar 25 into the recess 26 transmitting compressive and tensile loads. The tie bar 20 will thereby transmit compressive, tensile and torsional loads from post section 13 to post section 14 thereby considerably improving torsional and bending stiffness of the vehicle body. The tie bar 20 will also improve the antiburst capability of the doors if the vehicle is involved in an accident.

The clamping plunger 38 may be arranged to be energised upon closure of the door, for example by means of proximity or limit switches, while energisation of solenoid 30 may be controlled by means of a switch actuated when the T-bar 25 is located fully in recess 26. Alternatively, the clamping plunger 38 may be actuated upon starting of the engine or any other suitable operation. Furthermore, additional security from theft may be achieved by connecting the energising plunger 38 to the door locking system. The clamping means for the tie bar 20 may also serve as the catch means for securing the door 15 in its closed position.

Figure 5:
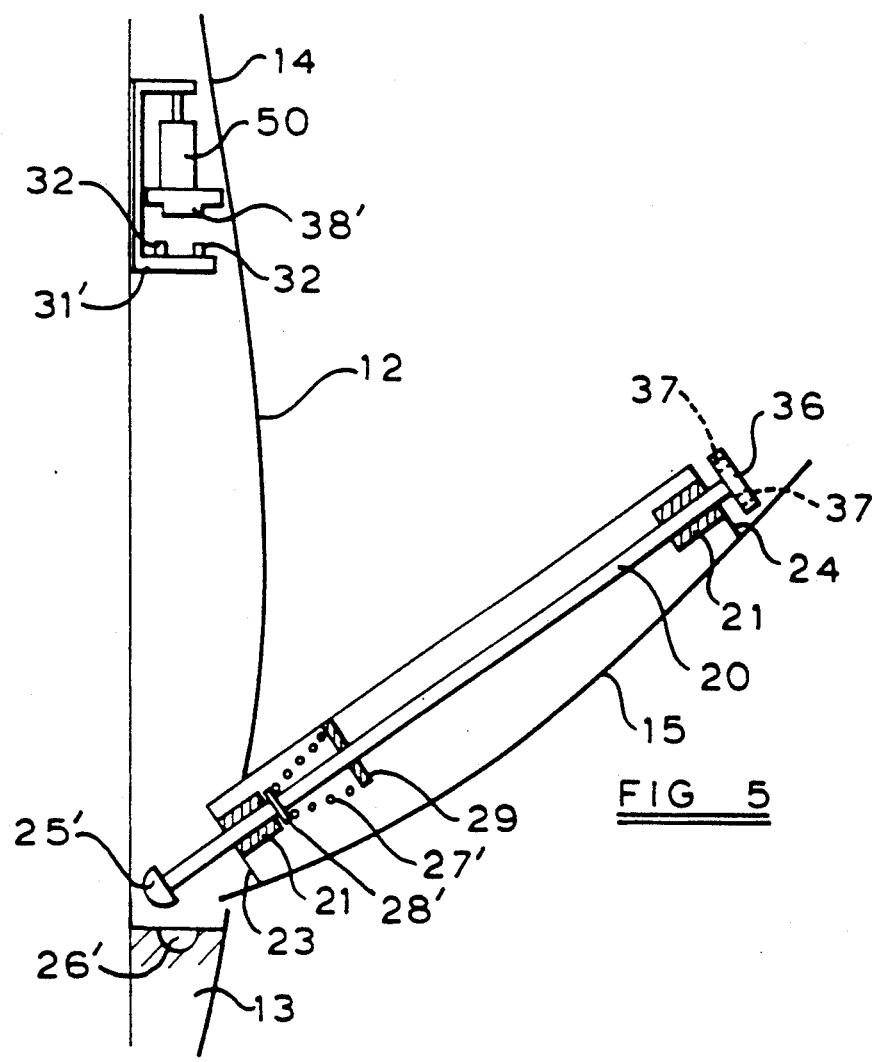
FIG. 5 shows diagramatically in similar view to FIG. 2, an alternative embodiment of the invention.

In an alternative embodiment of the invention as illustrated in FIG. 5, the tie bar 20 is biased towards post section 13 by means of a spring 27' engaging between circlip 28' on the tie bar 20 and bracket 29 secured to the door 15. The circlip 28' engages the bush bearing 21 adjacent edge 23 of the door 15, to limit forward movement of the tie bar 20.

A T-bar 25' of D-section is secured to the end of tie bar 20 adjacent post section 13. A cylindrical seat 26' is provided on the post section 13 for engagement of T-bar 25', when the door is closed. The T-bar 25' is adapted to come into engagement with the seat 26' when the door is partially open and as the door is closed, the T-bar 25' will pivot with respect to the seat 26' gradually moving the tie bar 20 rearwardly against the spring 27'.

The other end of the tie bar 20 is provided with a head formation 36 similar to that described above. When the door 15 is fully closed, the tie bar 20 will have been moved rearwardly sufficiently to bring the head formation 36 into engagement with the stop 38' mounted on the post section 14. The bifurcated keeper plate 31' with torsion pins 32 similar to those described above, is mounted on post section 14 forwardly of the stop 38', so that when the door 15 is closed and the head formation 36 engages stop 38', the keeper plate 31' and torsion pins 32 thereon, will be clear of the head formation 36. The keeper plate 31' is movable axially of the tie bar 20 when the door 15 is closed, towards stop 38' by means of a solenoid actuator 50, so that when the door 15 is closed the keeper plate 31' may be moved to clamp the head formation 36 and engage the torsion pins 32 in the holes 37 therein. The T-bar 25' may be clamped in the seat 26' in similar manner to that described above with reference to FIG. 4.

The tie bar 20 will thereby again be clamped when the door 15 is closed, so that it will transmit tensile, compressive and torsional loads between the post sections 13 and 14.

In a further embodiment of the invention, the tie bar 20 may be fixed relative to the door 15, the end formations being arranged to engage complimentary formations when the door is closed and clamping means similar to those disclosed with reference to FIG. 5 being used to provide clamping in tension, compression and torsion. Still further, formations similar to the end portions of the tie bar 20 may be secured to edges 23 and 24 of door 15 adjacent the upper edge thereof, the formations being adapted to be clamped in engagement with corresponding formations on the post sections 13 and 14, the door itself transmitting the tensile, compressive and torsional loads.

Various modifications may be made without departing from the invention. For example, the formations on the ends of the tie bar and complimentary formations on the post formations 13 and 24 may be varied as desired, provided that when in engagement they will transmit torsional loads. While in the above embodiments torsion pins are provided on the keeper plate to engage in holes of the head formation, the pins may alternatively be provided on the head formation and holes in the keeper plate. Furthermore, any suitable clamping means may be used to clamp the complimentary formations in engagement when the door is closed. While in the above embodiments solenoid controlled clamping means are described, any suitable actuating mechanism, for example mechanical, electrical or pneumatic may be used.

Figure 3:
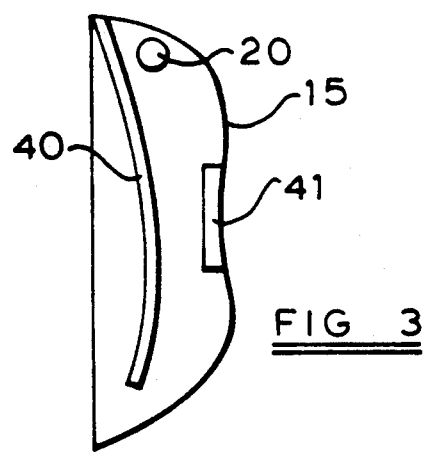
FIG. 3 shows a cross-section through the door.

As illustrated in FIG. 3 the tie bar 20 is located outboard of the door window 40 and will be fitted before the door window 40 and winder mechanism (not shown) are fitted. Alternatively, the tie bar 20 may be fitted inboard of the door window when it will be installed after the window and winder mechanism. It will be noted from FIG. 3 that the tie bar 20 is in addition to conventional side intrusion reinforcement 41, which is not coupled to with the forward and rearward posts 13, 14 and cannot consequently transmit loads therebetween. The side intrusion reinforcement 41 is also sited near to the neutral axis of the vehicle.

While the present invention will normally be applied to two or four door vehicles, it may be used for vehicles in which only one door is provided. Also while the invention is particularly applicable to convertible vehicles it may be used on vehicles with fixed roofs.

I claim:

1. A vehicle body having: a door aperture, the door aperture being bounded along its lower edge by a sill section and by forward and rearward upstanding post sections; and a door located in the aperture, the door being formed by inner and outer panels with side panels defining the side edges of the door, the outer panel extending beyond the side edges of the door, the door being hinged to one post section and releasably engaging a catch on the other post section; a tie bar having two opposed ends being provided adjacent an edge of the door remote from the sill section, the ends of the tie bar extending beyond the side edges of the door, a formation being provided at each end of the tie bar, a complimentary formation associated with each post section being provided for abutment of each formation axially opposite sides thereof, upon closure of the door, to transmit tensile and compressive loads between the forward and rearward post sections and means to prevent rotation of each formation with respect to its associated post section about the axis of the tie bar in order to transmit torsional loads between the forward and rearward post sections; the tie bar being biased away from the hinged edge of the door to a position in which the formation at each end of the tie bar will be clear of their complimentary formations on the post sections when the door is closed, means being provided to move the tie bar axially so that the formations on the tie bar move into engagement with the complimentary formations associated with each post section.

2. A vehicle body having: a door aperture, the door aperture being bounded along tis lower edge by a sill section and by forward and rearward upstanding post sections; and a door located in the aperture, the door being formed by inner and outer panels with side panels defining the side edges of the door, the outer panel extending beyond the side edges of the door, the door being hinged to one post section and releasably engaging a catch on the other post section; a tie bar having two opposed ends being provided adjacent an edge of the door remote from the sill section, the ends of the tie bar extending beyond the side edges of the door, a formation being provided at each end of the tie bar, a complimentary formation associated with each post section being provided for abutment of each formation on axially opposite sides thereof, upon closure of the door, to transmit tensile and compressive loads between the forward and rearward post sections and means to prevent rotation of each formation with respect to its associated post section about the axis of the tie bar in order to transmit torsional loads between the forward and rearward post sections; the formation being provided at the end of the tie bar remote from the hinged edge of the door being a head formation, the head formation being arranged to located between a pair of clamping elements of the complementary formation mounted on the associated post section, and means being provided for moving one clamping element towards the other to clamp the head formation therebetween.

3. A vehicle body according to claim 2 in which torsion pins are provided on one of the clamping elements and on the head formation and complimentary holes being provided in the other of the head formation and one of the clamping elements, so that when the clamping elements are clamped about the head formation the torsion pins will engage in the complimentary holes to prevent relative rotation therebetween.

4. A vehicle body having: a door aperture, the door aperture being bounded along its lower edge by a sill section and by forward and rearward upstanding post sections: and a door located in the aperture, the door being formed by inner and outer panels with side panels defining the side edges of the door, the outer panel extending beyond the side edges of the door, the door being hinged to one post section and releasably engaging a catch on the other post section; a tie bar having two opposed ends being provided adjacent an edge of the door remote from the sill section, the ends of the tie bar extending beyond the side edges of the door, a formation being provided at each end of the tie bar, clamping means associated with each post section being provided for engagement of each formation on axially opposite sides thereof, upon closure of the door, to transmit tensile and compressive loads between the forward and rearward post sections; and means to prevent rotation of each formation on the tie bar with respect to its associated post section about the axis of the tie bar, to transmit torsional loads between the forward and rearward post sections, the clamping means being releasable to permit opening of the door.

5. A vehicle body according to claim 4 in which the tie bar is mounted for axial movement with respect to the door.

6. A vehicle body according to claim 5 in which the tie bar is biased towards the hinged edge of the door, the formation at the end of the tie bar adjacent the hinged edge of the door being arranged to make initial contact with a complimentary formation on the adjacent door post as the door is closed, the tie bar being arranged to move axially of the door upon continued closing of the door, so that the formation at the other end of the tie bar is brought into engagement with a complimentary formation on the other door post.

7. A vehicle body according to claim 6 in which the engaging faces of the formation at the end of the tie bar adjacent the hinged edge of the door and its complimentary formation are radiused to permit relative pivoting thereof.

8. A vehicle body according to claim 4 in which the tie bar is fixed axially relative to the door, a complimentary formation being provided on each post section for engagement by the formations on the ends of the tie bar, and said clamping means being associated with the complimentary formations on each post section to clamp the respective formations on the tie bar thereto.

9. A vehicle body according to claim 4 in which the formation at the end of the tie bar adjacent the hinged edge of the door is a T-bar said means to prevent rotation being a complimentary recess in the associated post section, and said clamping means being provided to retain the T-bar in the recess when the door is closed.

10. A vehicle body according to claim 9 in which the clamping means comprises a pair of linear bearings mounted longitudinally one on either side of the recess, a pair of clamping bars slidingly located across the linear bearings and means for moving the clamping bars between a position clear of the recess and a position in which they overlie the recess and T-bar when located therein.

* * * * *